United States Patent [19]
Köhler et al.

[11] 4,366,182
[45] Dec. 28, 1982

[54] METHOD AND INSTALLATION FOR ROASTING AND GRILLING SKIN-COVERED MEAT PRODUCT, SUCH AS POULTRY AND PARTICULARLY CHICKEN

[76] Inventors: Karl-Axel Köhler, Torggatan 6, 11265 Stockholm; Rolf Collin, Ringparhen 5, S 13150 Saltsjoe Duvnaes; Ralf Larsson, Brovautare Gt. 37, S-43136 Mölndal, all of Sweden

[21] Appl. No.: 301,962

[22] Filed: Sep. 14, 1981

[30] Foreign Application Priority Data

Sep. 17, 1980 [SE] Sweden ................................ 8006536

[51] Int. Cl.³ ............................................. A47J 37/00
[52] U.S. Cl. ...................................... 426/644; 99/326; 99/329 P; 99/346; 99/420; 426/243; 426/438
[58] Field of Search ........................ 426/644, 243, 438; 99/339, 346, 420, 326, 327

[56] References Cited

U.S. PATENT DOCUMENTS

| | | | |
|---|---|---|---|
| 2,001,116 | 5/1935 | Smith | 99/346 X |
| 2,839,409 | 6/1958 | Matlen | 99/346 X |
| 2,980,544 | 4/1961 | Mills | 426/243 X |
| 3,597,228 | 8/1971 | Jeppson et al. | 426/243 X |
| 3,928,634 | 12/1975 | Gasbarro | 426/644 X |
| 4,244,285 | 1/1981 | Baker | 99/339 |

FOREIGN PATENT DOCUMENTS

7047650  8/1972  France ................................ 99/420

*Primary Examiner*—Arthur D. Kellogg
*Attorney, Agent, or Firm*—Silverman, Cass & Singer, Ltd.

[57] ABSTRACT

A skin-covered meat product, such as poultry and especially chickens, is roasted and grilled in a cassette-oven installation with a roasting oven, a spray box and a grilling oven. First the skin of the chicken is perforated by injection needles and simultaneously a saline solution with atomized seasonings is injected into the chicken meat. At a starting position the chickens are threaded and fastened on a vertical rotary spit suspended on an endless conveying chain (24), the spits are electrically heated and together with the chickens are transported through the roasting oven where the chickens are exposed to short-wave infrared radiation and roasted. The spits with the chickens thereafter are transported through the spray box where the chickens are sprayed with a mixture of oil and atomized seasonings and then are transported through the grilling oven where the chickens are exposed to medium-wave infrared radiation and grilled. Whereafter the spits now without being heated but still being rotated are transported with the chickens outside the cassette-oven and, while the chicken is being cooled, to the vicinity of the starting position (A) where the chickens in a completely prepared state are picked from the spit.

2 Claims, 4 Drawing Figures

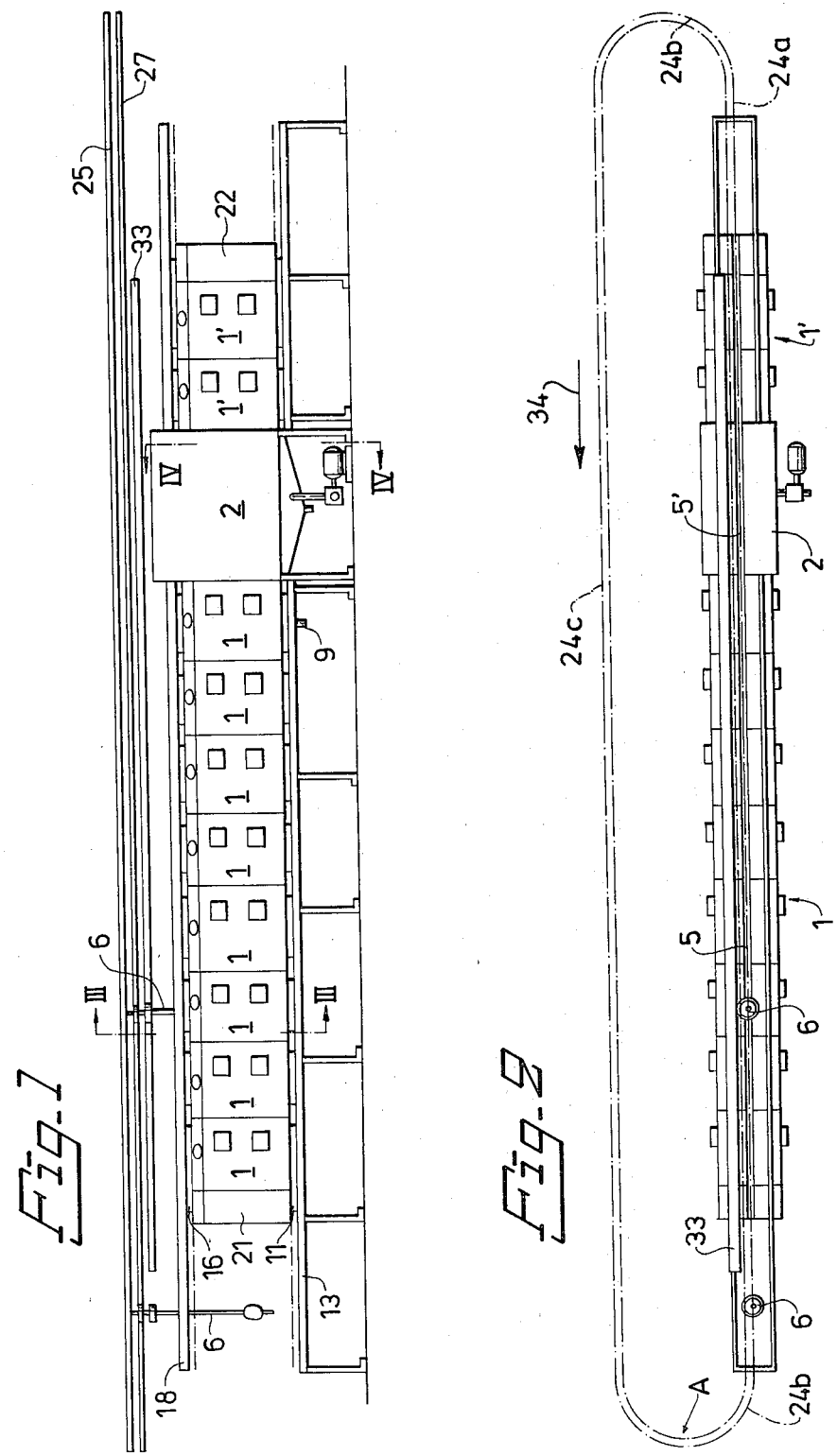

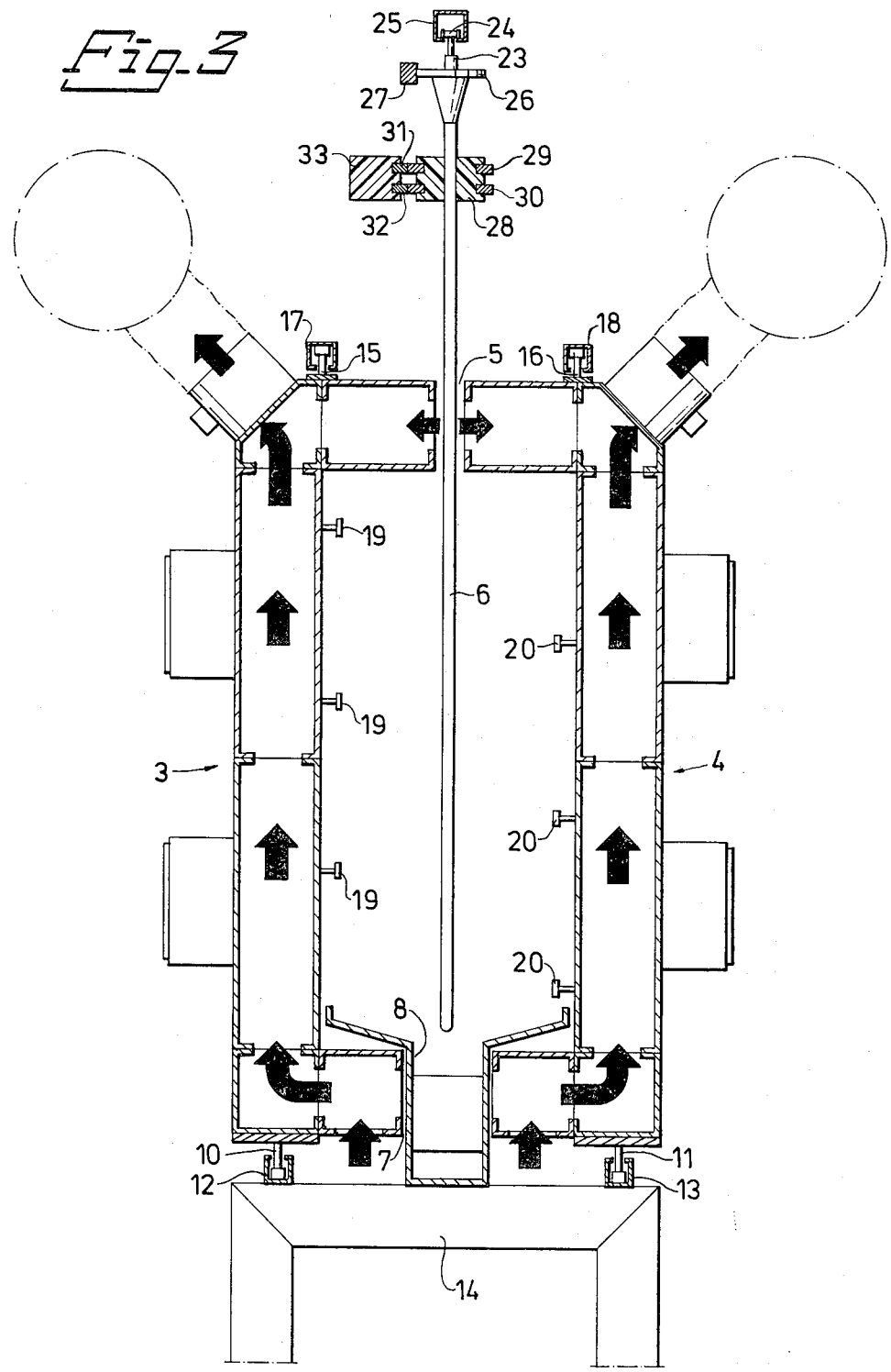

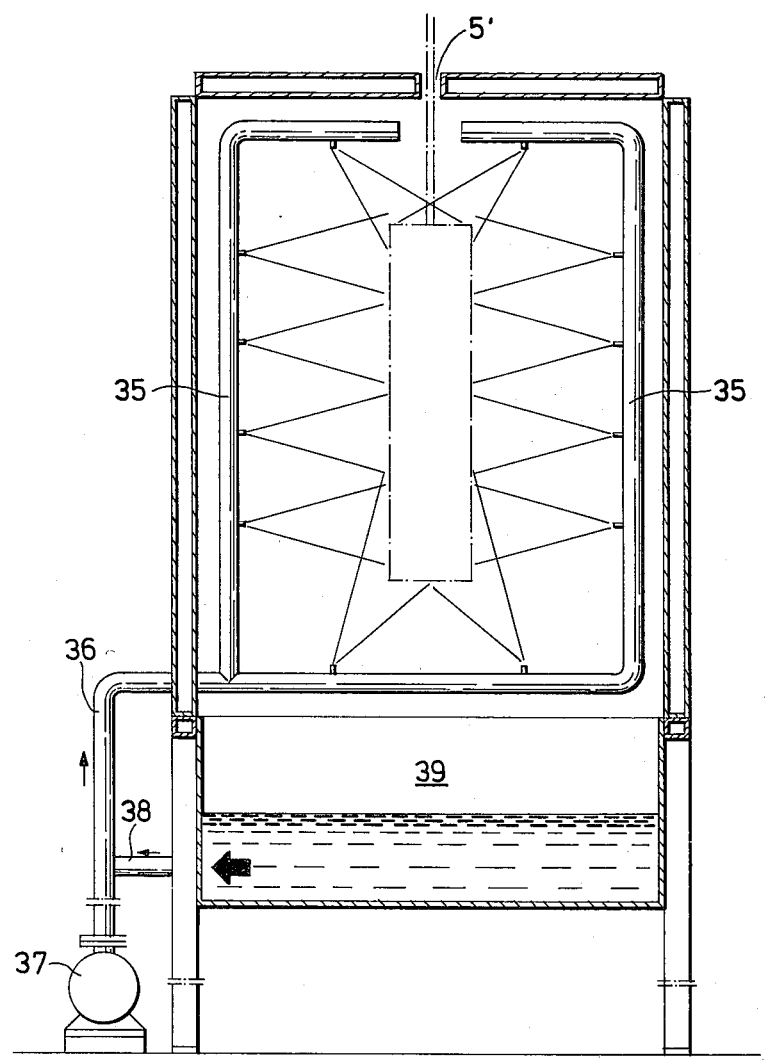

METHOD AND INSTALLATION FOR ROASTING AND GRILLING SKIN-COVERED MEAT PRODUCT, SUCH AS POULTRY AND PARTICULARLY CHICKEN

The present invention relates to a method for roasting and grilling a skin-covered meat product, such as poultry and particularly chicken, and to an installation for carrying out the method in one single cycle from a supply place to a pick-up place for the product.

It is known that poultry or other meat products that are covered with skin, when subjected to heat radiation above a certain intensity, shows the effect that the moisture prevailing beneath the skin vaporizes. Due to the overpressure of the vapour, bubbles are formed which insulate the meat beneath from the heat radiation. As a result, the meat product under the bubbles is roasted insufficiently, and at the same time the skin covering the bubbles is burnt. The meat product, therefore, is subjected to only moderate heat radiation for a long time in order to bring about thorough heating, and to prevent the skin from burning and the seasonings applied to the meat product from getting charred. The long processing time is obtained by repeatedly moving the meat product past the heat radiator.

The present invention provides a method and an installation, by which especially the processing time of the meat product to a substantial degree is shortened, the tastefulness is maintained, and the handling is simplified.

This is achieved in that the method and the installation according to the invention have the characterizing features defined in the attached claims.

The method according to the invention is explained in the following in connection with the description of an installation according to the invention as shown by way of example in the accomanying drawings, in which FIG. 1 is a schematic side elevational view of an installation according to the invention, FIG. 2 is a plan view of the installation in FIG. 1, FIG. 3 is a cross-section of the installation on an enlarged scale along the line III—III in FIG. 1, and FIG. 4 is a cross-section of the installation on an enlarged scale along the line IV—IV in FIG. 1.

The installation for roasting and grilling a skin-covered meat product, such as a chicken, as shown in FIGS. 1 and 2 comprises an elongated cassette-oven formed by a plurality of oven cassettes 1 and 1', a spray-box 2 and inlet and outlet sluice 21 and, 22, respectively.

FIG. 3 is a vertical cross-section through an oven cassette 1 that is formed of two C-shaped cassette halves 3,4. The halves are separated from one another at the top by an upper slit 5 to leave space for a grill spit 6 to pass therethrough and at the bottom by a wider slit 7 to leave space for a drip-groove 8. Drip-groove 8 is provided with an outlet 9, see FIG. 1. Each cassette half 3,4 is provided on its lower surface with a slide bar 10,11, which rests in a groove-shaped guide bar 12,13 rigidly attached on trestles 14. The cassette halves each are provided on their upper surfaces with a slide bar 15,16 guided in rigidly attached guide bars 17,18. All bars extend in the longitudinal direction of the cassette-oven, and the guide bars project a short distance beyond both ends of the cassette-oven as shown in FIGS. 1 and 2. It is hereby possible to pull apart the oven cassettes 1,1' on the guide bars and thus to gain access to the interior of the cassettes.

The oven cassettes 1 and 1' substantially have the same structural design and preferably comprise reflecting inner walls, which carry infrad-red ray tubes 19,20. Said tubes in the oven cassettes 1 emit short wave radiation penetrating into the depth of the meat product for roasting the same, and the tubes in the oven cassettes 1' emit medium-wave radiation for grilling the meat product. Consequently, the oven cassettes 1 form a roasting oven of, for example, 8 m length with a temperature of, for example, 160° to 180° C., and the oven cassettes 1' form a grilling oven of, for example, 2 m length with a temperature of, for example, 180° C. or slightly higher. The power supply in the oven cassettes 1, i.e. the roasting oven, may be, for example, 6 kW per side and per running meter, and in the oven cassettes 1', i.e. the grilling oven, twice said value.

The spit 6 is suspended via a rotary coupling 23 on an endless conveying chain 24, which in turn is supported by a horizontal suspended rail 25 extending like an orbit in an endless loop.

In FIG. 2 the extension of the conveying chain 24 is indicated by a dash-dotted line, from which is apparent that the conveying chain 24 includes a portion 24a straight above and along the upper slit 5, two arched end portions 24b and a portion 24c in parallel with the portion 24a. The conveying direction of the chain 24 is indicated by an arrow 34. On the upper portion of the spit 6 a circular disc 26 is located. The circumference of disc 26" abuts a horizontal bar 27 that extends along the entire length of the suspended rail 25, or the greater part thereof, and in parallel with said rail as shown in FIGS. 1,2. Near the upper end of the spit 6 a circular insulation body 28 is attached, which on its periphery carries two separated annular current collectors 29, 30. Each collector is in contact with a collector rail 31,32 on a horizontal support strip 33 having substantially the same length as the cassette-oven. Said spit 6 is tubular and is provided in its interior with a resistance helix, the ends of which are connected to a current collector 29,30. The spit 6 is heated only along the part thereof which is covered by the meat product. The voltage of the collector rails 31,32 preferably is 48 volts. Spits 6 are suspended along the entire conveying chain 24 in spaced relationship of about 30 cm, and the cycle time for the conveying chain may be 18 to 20 minutes.

FIG. 4 shows the spray-box rigidly attached between the oven cassettes 1 and 1'. The box is provided with a roof slit 5' for passage of the spits 6. In said spray-box 2 nozzle frames 35 are mounted and connected via a supply conduit 36 to a pump 37 with an inlet 38 from a trough 39 filled with a liquid mixture of oil and seasonings, in which the seasonings are very finely distributed (atomized), so that the meat products suspended on spits and passing through the spray-box 2 can be sprayed with the mixture. The excess mixture runs down to the trough 39, through which a circulation system for the mixture is provided. The spray equipment can be easily controlled or adjusted with respect to pressure, flow, spraying angles etc.

The operation and the advantages of the method according to the invention and of the installation described are as follows. It is presupposed that chickens are to be prepared. The skin of the chickens, especially on breast and legs, is perforated preferably by means of a pair of tongs provided with injection needles, whereby bubbles are prevented from arising there, and at the same time a saline solution with atomized seasonings added thereto is injected. This has the result that the entire meat mass is seasoned and, the seasonings avoid getting burned as is the case when conventionally the chicken only is sprinkled with dry seasonings. The spits 6 are arranged with spaced relationship of about 30 cm along the conveying chain 24, but in FIGS. 1, 2 only two spits are shown. When a spit is at the place indicated in FIG. 2 by A, two to five chickens are pushed on each spit 6 and are retained there by a locking member, which possibly may be a cotter through the spit beneath the chickens. During the continued movement of the spit, immediately thereafter the current collectors 29,30 contact the collector rails 31,32 on the support strip 33, so that the spit is heated and heats the chickens from inside. When the spit with the chickens has passed the entrance sluice 21, the chickens during all their passage through the roasting oven 1 are exposed to short-wave infra-red radiation from IR-tubes 19,20 and to a temperature of 160° to 180° C. Due to the rotation of the spit, the chickens are exposed to a uniform radiation all about which penetrates deep into the chickens. This radiation together with the internal heating by the spit results in a rapid heating and drastic shortening of the roasting time to about one third of the normal time. The vapor formed during the rapid heating escapes through the perforations in the skin.

When a spit with chickens has passed through the roasting oven formed by the oven cassettes 1, it enters the spray box 2 where the chickens during their passage are sprayed efficiently on all sides with a mixture of oil and atomized seasonings dissolved therein from the trough 39. Thereafter the spit with the chickens enters the grilling oven formed by the oven cassettes 1' where the chickens during their passage through the oven are exposed, in addition to the internal heating by the spit, to medium-wave infra-red radiation from IR-tubes there located, so that the chickens are grilled and assume an advantageous brown colouring, to which also the spraying with oil in the spray box 2 had contributed.

The spit with the chickens leaves the grilling oven through the exit sluice 22 and there also disengages from the collector rails 31,32 on the support strip 33. During the continued movement of the spit outside the cassette-oven, the spit with the chickens rotates whereby the chickens are cooled. Immediately before the spit with the chickens has arrived at the starting point A, the chickens are picked from the spit preferably automatically and rush down into a transport container or onto a conveyor belt. The chickens then are in a completely prepared state, after a total processing time of 18 to 20 minutes, which is the cycle time of the conveying chain 24. The entire installation is intended to be controlled centrally from an electric control cabinet where the heat can be controlled individually on each running meter of the oven, and on the last two meters in the grilling oven the brown coloring is finely adjusted.

The method and the installation according to the invention especially show the following advantages. In relation to conventional roasting and grilling ovens the period from preparation to completely ready state proceeds at a substantially reduced time, because the chickens are exposed simultaneously to external and internal heat supply. Hereby also the weight loss is reduced due to a decrease in the discharge of meat juices, and at the same time a better final result than heretofore with respect to taste and appearance is obtained. Perforation of the skin prevents bubble formation and thereby also the arisal of burnt spots. As the carrying spit is penetrated through the chickens, and the chickens are not bound rigidly to one side of the spit, the heat radiation is distributed uniformly over the entire surface of the chickens. The labor demand is reduced substantially compared with conventional grills of the type as used, for example, in food shops.

The method and installation according to the invention can be modified within the scope of the invention. The injection of saline solution with seasonings can be excluded. The spray box with the spraying operation there can be replaced by some other design. The length of the cassette-oven can be shortened by designing the conveying arrangement so that the meat product is moved in a zigzag or arched movement either vertically or horizontally through the oven.

We claim:

1. A method of roasting and grilling a skin-covered meat product, such as poultry and especially chickens, that is supported by a spit, the spit being suspended vertically from a horizontal conveyor and being heated electrically, the meat product being transported through an oblong cassette oven with heat radiation tubes, characterized in that the skin of the chicken is perforated by means of injection needles, by which simultaneously a saline solution and seasonings atomized therein are injected into the chicken meat, that the chicken is threaded and fastened on the spit whereby the chicken is heated internally, that the heated spit with the chicken is transported in one single cycle and while being rotated through a roasting oven constituting a part of the cassette-oven where it is exposed externally to preferably short-wave infrared radiation for a lower surface effect during the roasting of the chicken, and directly thereafter is transported through a spray box and sprayed with a liquid mixture of oil and finely distributed atomized seasonings, and directly thereafter is transported through a grilling oven constituting a part of the cassette-oven where it is exposed to preferably medium-wave infrared radiation for a higher surface effect during the grilling of the chicken, that the heating of the spit is interrupted, and the spit with the chicken is transported while being cooled from the grilling oven to outside the cassette-oven close to a place where the chicken was threaded on the spit and where the chicken then is picked from the spit.

2. An installation for roasting and grilling a skin-covered meat product, such as a chicken, which is pretreated in that the skin of the chicken is perforated and a saline solution with atomized seasonings is injected into the chicken meat, which installation comprises an oblong cassette-oven with heat radiation tubes and an upper slit in the oven roof for the passage of vertically suspended rotary spit, characterized in that the cassette-oven in series comprises a roasting oven, a spray box and a grilling oven, that the heat radiation tubes of the roasting oven preferably are short-wave infrared radiation tubes, that the spray box is provided with nozzle frames for ejecting a liquid mixture of seasonings and oil, that the heat radiation tubes of the grilling oven preferably are medium-wave infrared radiation tubes, that the spit is suspended rotatably in a horizontal conveying means, such as a conveying chain, which as an endless horizontal loop extends with one portion substantially straight above the upper slit along the entire length of the cassette-oven and a short distance outside the ends thereof transforms via its arched portion to a portion, which extends in parallel with said firstmentioned portion and spaced therefrom, and that collector rails in contact with current collectors on the spit extend only along the length of the cassette-oven.

* * * * *